Patented Sept. 20, 1932

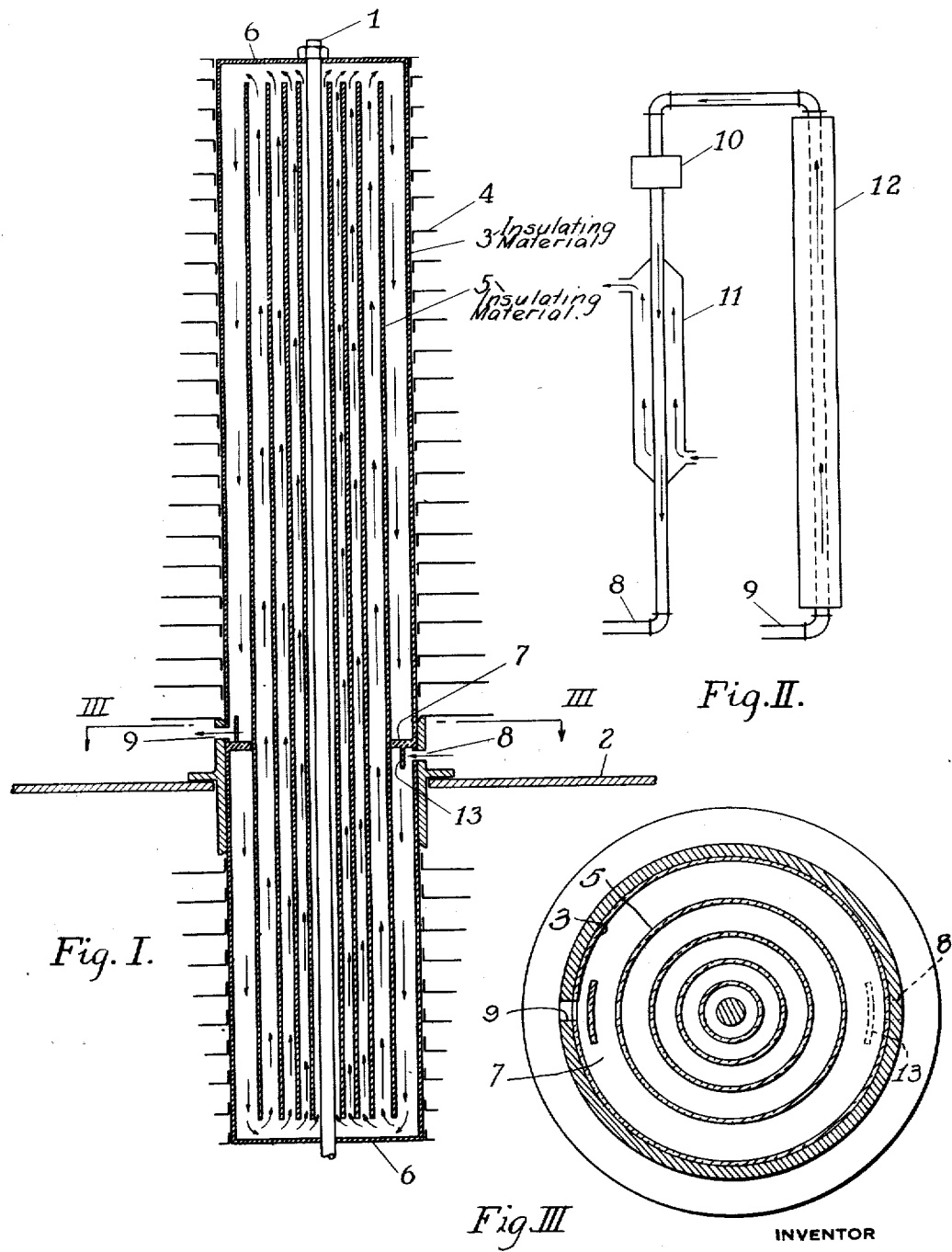

1,878,094

UNITED STATES PATENT OFFICE

RALPH W. ATKINSON, OF PERTH AMBOY, NEW JERSEY, ASSIGNOR, BY MESNE ASSIGN-
MENTS, TO GENERAL CABLE CORPORATION, A CORPORATION OF NEW JERSEY

OIL-COOLED TERMINAL

Application filed December 17, 1926. Serial No. 155,457.

My invention consists in the structure and in the method of operation of certain electrical installations which include a dielectric of fluid nature, in consequence of which heat due to dielectric losses may be dissipated, and the installation rendered serviceable in wider fields of usefulness.

In the accompanying drawing Fig. I is a view in vertical and medial section of a terminal extending through the wall of a transformer, and this terminal is adapted structurally to the practice of my invention. Fig. II is a view to smaller scale, illustrating diagrammatically and in side elevation an accessory piece of apparatus which though not essential, will in some instances be advantageously provided. Fig. III is a view in horizontal section of the structure shown in Fig. I, and on the plane indicated by the line III—III, Fig. I.

Referring first to Fig. I of the drawing, a high-tension lead 1 is shown, extending through an orifice in the casing wall 2 of a transformer. This wall will be understood to be of metal. The high-tension lead in the region of its passage through the casing wall is surrounded with a body of insulation adapted to afford high radial dielectric strength, and the problem with which the engineer has to do, is to make this body of insulation safe against breakdown.

For very high voltages, or for very high frequencies even at relatively low voltages, there is dissipated in any terminal or high-tension bushing, a considerable amount of energy, as dielectric loss. With materials of very low power factor this loss can be minimized, and operation at moderately high voltages can be enjoyed without excessive heating. This factor of dielectric loss, however, has been an important limiting factor in the building of high-tension bushings. It has been found, for example, in cable construction that dielectric loss becomes considerable when operating at 80 K. V. (that is to say, 80 K. V. to ground, or approximately 135 K. V. between the phases of a grounded neutral three-phase circuit), and it becomes desirable to keep down this factor of dielectric loss. It is to be remarked that the internal temperature rise within the body of insulation which surrounds a conductor is not decreased by increasing the thickness of the insulation, and it is to be remarked further that the dielectric loss for a given envelope of insulation varies as the square of the voltage. Inasmuch as increase of thickness has no effect to keep temperature down, it is manifest that the problem of heat dissipation becomes increasingly important as voltage increases.

The structure here shown is in its general features that shown and described in an application for Letters Patent of the United States filed by me, July 1, 1926, Serial No. 119,898. See particularly Fig. VII of the drawing. It includes a sleeve 3 of insulating material, firmly set in vertical position in an orifice in the transformer wall, through which the high-tension lead 1 extends. Externally, the sleeve 3 may carry strain-distributing rings 4 of metal. Concentrically within sleeve 3 other sleeves 5, in this instance four in number, are arranged. The high-tension lead 1 extends coaxially within this assembly of sleeves 3 and 5.

The outermost sleeve 3 is provided with end closures 6 which, allowing passage through them of lead 1, form with the sleeve a closed casing. The sleeves 5 (there may be one or more) are so constructed that in the regions adjacent their ends communication is afforded between the inner and outer spaces which the sleeves define. This end is conveniently attained by forming the sleeves 5 less in length than sleeve 3; they are suitably spaced and supported within the casing, by means not shown, but such as will be well understood, so as to stand in coaxial arrangement, equally spaced from the two ends of the casing, and dividing the space within the casing into a plurality of channels interconnected at the ends, as is clearly indicated in Fig. I. The channels within the casing, so formed by and between the sleeves 5, are filled with fluid insulation of any preferred nature. This fluid might be carbon tetrachloride; it might even be gaseous. Ordinarily it will be what is known as insulating compound, and preferably a high-grade mineral oil, or, as it is termed in this industry, transformer oil.

Preferably, though not necessarily, I set at a convenient point in the length of the structure, a transverse barrier 7 across the space between the sleeve 3 and the next inner sleeve 5, and on opposite sides of this barrier I form through sleeve 3 an inlet opening 8 and an outlet opening 9. I connect at these openings 8 and 9 the circulation system shown diagrammatically in Fig. II. The leads through which connection is completed are correspondingly designated 8 and 9 in Fig. II.

This circulation system consists essentially of a length of conduit, formed in part at least with walls of heat-conducting material, and the walls will be so particularly shaped and disposed as to effect cooling. This is a matter well known, and details of structure need not be dwelt upon. This conduit throughout all its extent is filled with the same fluid, forming one body with the fluid which fills the casing 3. Circulation of the fluid and absorption of heat may be stimulated by suitable expedients. In Fig. II, I show one portion of the extent of the conduit cooling apparatus in the form of a water jacket 11, and elsewhere heat insulating lagging 12, enveloping the conduit. These accessory appliances tend to accelerate automatic circulation of the fluid through the system and absorption of heat from the flowing stream. Means may be provided, if desired, such as a pump 10, for positively circulating the fluid through the system.

When the structure described is in operation, and when lead 1 is carrying a current of high tension (in case of alternating current of high frequency, then even at a moderate tension), the electrostatic stress exerted upon the surrounding insulation produces dielectric loss in that insulation, in the fluid and in the solid barriers, but particularly in the portion of the fluid nearest to lead 1 and within the innermost sleeve 5. The resulting liberation of energy in the form of heat produces a temperature rise which has hitherto been a limitation upon the magnitude of the current which can be conveyed (the limit standing at a still lower potential in the case of high-frequency alternating current than in the case of direct current or of alternating current of commercial frequency), for the temperature rise may reach the point where physical or chemical disintegration of the insulating material begins.

Some remedy for the condition indicated may be obtained most simply in a structure such as that shown in Fig. I, but lacking the barrier 7 and the inlet and outlet openings 8 and 9, and lacking of course the circulation system shown in Fig. II. In such case, the heating of the fluid insulation within the innermost sleeve 5, incident to service, and to a high degree relatively to the portions of the fluid external to the innermost sleeve 5, will, by virtue of the vertical position of the sleeves and the interconnection at their ends of the passageways formed by and between the sleeves, set up a circulation of fluid through the passageways. The most highly heated portion will by such circulation be carried from the innermost passageway outward, and will be replaced by less highly heated portions coming from outer parts of the structure. And always the circulating stream of fluid will be giving up heat to the surrounding atmosphere. By such means and in such manner, it becomes possible to operate a given structure continuously and successfully under more exacting conditions of potential or of frequency or of both, than would be possible with a structure otherwise the same, but lacking the provision for circulation of the fluid insulation.

According to my invention, the effective radiating surface of the terminal for dissipating the dielectric losses may be increased by installing radiating surface on the top of the terminal itself. This might be for instance, a reservoir on the top of the terminal. In the simplest form, this would be merely an extension of the outermost sleeve 3 above the top of the terminal proper, this extension being preferably of metal to facilitate the convection of the heat from within. In more complex form, this portion might be enlarged in diameter or it might be arranged with additional cooling surface by any of the means commonly used to facilitate the convection of heat from exterior surfaces. Such provisions for increasing the rate of heat dissipation may be found advantageous, particularly in case the circulation system of Fig. II be not employed.

The provision of barrier 7, of the inlet and outlet openings 8 and 9, and of a circulation system such as that described with reference to Fig. II, effects a more rapid circulation of insulation and a more pronounced cooling, intensifies the effect, and enlarges the field of usefulness of the invention.

If openings such as 8 and 9 be provided, the structure may be strengthened electrically by arranging plates 13 of solid insulating material within sleeve 3 and opposite the openings, with space for fluid flow between. Or the number of sleeves 5 may be increased to such extent that the structure affords sufficient insulation, without any insulating effect rendered by sleeve 3.

In the use of transformers equipped with terminals of types at present in use, the rating of a particular apparatus is often limited by the heating in the terminal consequent upon dielectric loss within it. A terminal of the structure herein illustrated may be built of dielectric materials chosen for low dielectric characteristics. The sleeves or barriers 3 and 5 may be formed of a material which will afford both high dielectric strength and low dielectric loss, and while not limiting myself in this particular, I note that glass varies in this respect, and that certain varieties of glass are responsive to the requirements which here I have set. Quartz is another material suitable for use in forming these sleeves. The fluid, as has been said, will ordinarily be oil; this material also may be chosen, to afford relatively low dielectric loss. With the combination of low dielectric loss materials and the means described of dissipating resultant heat, low temperature may be maintained even when operating at exceedingly high potential.

Within the range of present-day commercial transmission, my invention may be applied with relatively little effect. But for voltages used in testing equipment and with the demand for apparatus to withstand higher and higher voltages, my invention becomes increasingly valuable, and makes unnecessary such costly and elaborate structures as otherwise must be resorted to, to meet the demand.

I have described my invention in application to a terminal set in the wall of a transformer. It remains to remark that the invention is applicable wherever the electrical conditions obtain which by the means described may be dealt with, and the tendency to defective service guarded against. For example, the problem recently arose of carrying power to the antennæ of radio transmission apparatus through the steel deck of a battleship. Lacking my present invention, it is necessary to form a large hole in the deck armor, in order to take advantage of air as insulation. By resort to my present invention, an insulating bushing of smaller dimensions but adequate to the necessities of that case may be made, and the opening in the deck plate of the ship may correspondingly be of diminished size. Again, the invention is manifestly applicable to a cable terminal, where the conductor of an insulated and lead-sheathed cable is continued in a bare aerial.

I claim as my invention:

1. In an electrical installation, the combination, with a conductor, of an insulating bushing including a casing of insulating material surrounding the conductor, a sleeve arranged within the casing and surrounding the conductor and spaced from the conductor within it and from the casing outside of it and in regions adjacent its ends affording communication between the inner and outer spaces which it defines, a transverse barrier across the space between casing and sleeve, the casing being provided with inlet and outlet openings on opposite sides of said barrier, and means for maintaining in circulation through such openings a body of fluid insulation.

2. In an electrical installation, the combination, with a conductor, of a high tension insulating bushing including a casing of insulating material surrounding the conductor, a sleeve within the casing and surrounding the conductor, a transverse barrier across the space between said casing and said sleeve, and openings through said casing on opposite sides of said barrier to permit the circulation of fluid insulation from an external source through said bushing.

In testimony whereof I have hereunto set my hand.

RALPH W. ATKINSON.

CERTIFICATE OF CORRECTION.

Patent No. 1,878,094.　　　　　　　　　　　　　　September 20, 1932.

RALPH W. ATKINSON.

It is hereby certified that error appears in the printed specification of the above numbered patent requiring correction as follows: Page 2, line 26, after "show" insert the word in; and that the said Letters Patent should be read with this correction therein that the same may conform to the record of the case in the Patent Office.

Signed and sealed this 22nd day of November, A. D. 1932.

(Seal)

M. J. Moore,
Acting Commissioner of Patents.